Oct. 21, 1958 H. B. DRAPEAU 2,857,105
THERMOSTATIC VALVE
Filed Oct. 20, 1955
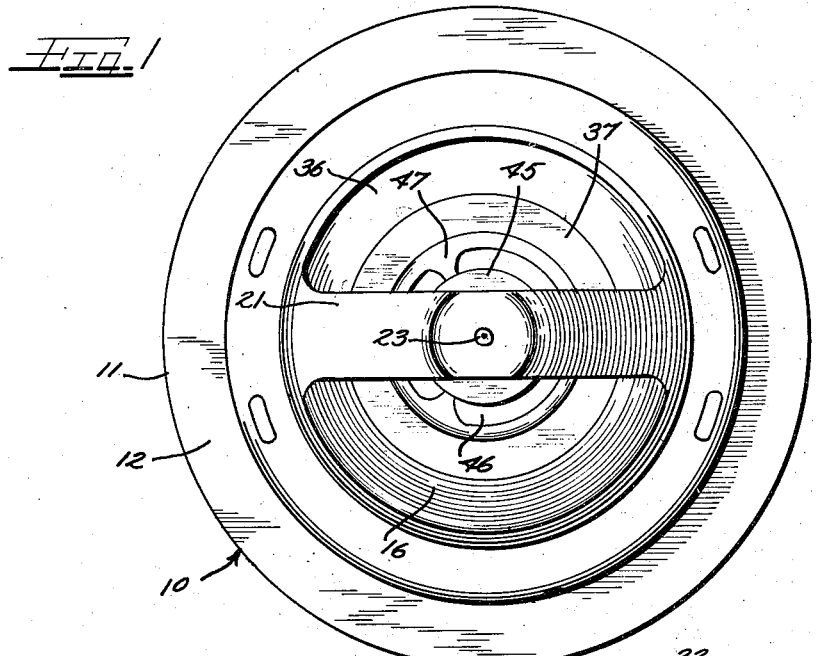
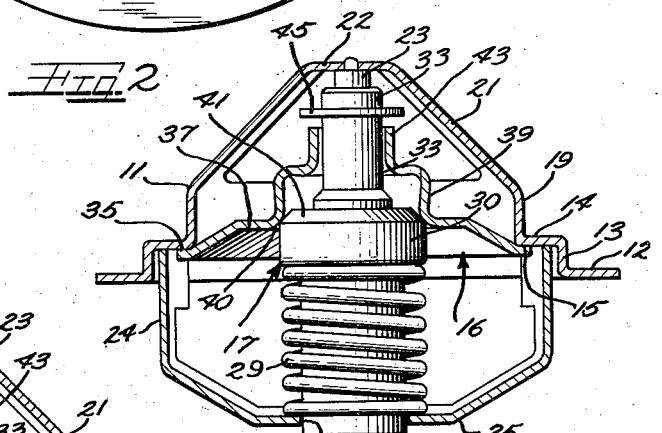
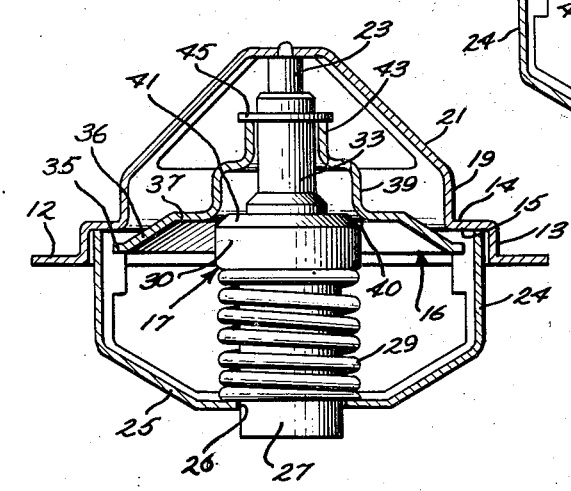
Inventor
HAROLD B. DRAPEAU United States Patent Office 2,857,105
Patented Oct. 21, 1958

2,857,105

THERMOSTATIC VALVE

Harold B. Drapeau, Oak Park, Ill., assignor to The Dole Valve Company, Chicago, Ill., a corporation of Illinois Application October 20, 1955, Serial No. 541,676

8 Claims. (Cl. 236—34)

This invention relates to improvements in thermostatic valves for cooling systems and more particularly relates to such valves adapted for use in pressurized cooling systems for internal combustion engines.

A principal object of the invention is to provide a thermostatic valve for controlling the temperature of the coolant of an internal combustion engine, of a simpler and more efficient construction and arrangement than the valves heretofore used for this purpose.

Another object of the invention is to simplify the construction of thermostatic valves for controlling the flow of the coolant for cooling internal combustion engines by floatingly carrying the valve on the thermal sensitive element and utilizing the thermal sensitive element is a metering valve to meter the flow of low temperature fluid.

A still further object of the invention is to provide a thermostatically operated valve in which a single annular valve member floatingly carried on a thermal sensitive element forms a valve for accommodating a high flow rate of coolant during hot weather conditions and forms a seat to accommodate a low flow rate of coolant during cold weather conditions, metered by movement of the thermal sensitive element with respect to the valve upon changes in temperature.

Still another object of the invention is to provide a novel form of thermostatically operated valve particularly adapted for use in pressurized cooling systems for internal combustion engines in which the valve is freely carried within the valve housing and a solid fill thermal sensitive element extends through the valve and opens the valve to accommodate the flow of high temperature coolant and also forms a metering valve relatively movable with respect to the valve to meter the flow of low temperature coolant, and in which a single spring retains the thermal sensitive element to the valve housing, biases the thermal sensitive element to move toward the valve and biases the valve toward a closed position.

These and other objects of the invention will appear from time to time as the following specification proceeds and with reference to the accompanying drawings wherein:

Figure 1 is a top plan view of a thermostatic valve constructed in accordance with the invention;

Figure 2 is a cross sectional view taken through the valve, showing the valve in a fully closed position; and Figure 3 is a cross sectional view taken through the valve showing the valve in an open position.

In the embodiment of the invention illustrated in the drawing, I have shown a thermostatically operated valve 10 having a housing 11 having an annular flange 12 extending thereabout, adapted for sealing connection between the cylinder head (not shown) of an internal combustion engine and the hose fitting (not shown) leading from the water jacket of the engine, in a manner well known to those skilled in the art so not herein shown or described. The annular flange 12 terminates at its inner margin into an upright wall 13 extending perpendicular with respect thereto, which in turn terminates into an annular wall portion 14, the underside of which forms a seat 15 for an annular valve 16 floatingly carried within the housing 11 of a thermal sensitive element 17.

The annular wall 14 terminates into a wall 19, extending perpendicular thereto and having an integrally formed strap 21 extending thereacross from diametrically opposed points. The strap 21 extends angularly upwardly and inwardly from opposite sides of the wall 19 and has a flat seat 22 at its apex, forming a reaction member for a piston 23 of the thermal sensitive element 17. The open spaces on opposite sides of the strap 21 form ports for the passage of coolant through the housing into the hose fitting (not shown) of the internal combustion engine, and to and through the radiator (not shown), as is usual in internal combustion engine cooling systems.

The housing 11 also has a retainer 24 spaced inwardly of the wall 13 and extending therefrom in an upstream direction. The retainer 24 abuts the undersurface of the annular wall 14 and is riveted or peened thereto.

The retainer 24 includes a bridge 25 having a central opening 26 therein through which slidably extends a casing 27 for the thermal sensitive element 17. A compression spring 29 is shown as being seated on the bridge 25 and as abutting the undersurface of a heat conducting ring of the thermal sensitive element 17, and biasing the piston 23 into engagement with the seat 22. The spring 29 also biases the thermal sensitive element into engagement with the valve 16 to meter the flow of coolant through a seat 40 of the valve and to bias the valve toward closed position, as will hereinafter be more clearly described as this specification proceeds.

The thermal sensitive element 17 is of the so-called high motion or solid fill type of thermal sensitive element, the casing 27 of which contains a fusible thermal expansible material such as a wax alone, or a wax and a powdered metal heat conducting material and a binder, reacting against a flexible membrane (not shown) at the upper end of said casing for extending the piston 23 from a cylinder 33 of the thermal sensitive element upon fusion of the fusible material contained within the casing 27, at the operating range of the thermal sensitive element, as in the Vernet Patent No. 2,386,181, dated January 30, 1945.

The valve 16 is generally annular in form and is shown as having an outer annular valve surface 35 engageable with the shoulder 15 when the valve is closed. The annular valve surface 35 terminates into an inwardly and angularly upwardly extending frusto-conical surface 36 from which extends a horizontal surface 37 turning upwardly at its inner margin into a cylindrical wall 39. The junction between the underside of the horizontal wall 37 and the inside of the cylindrical wall 39 forms a curving shoulder forming the valve seat 40 engageable by a frusto-conical valve surface 41, herein shown as being formed on the heat conducting ring 30 of the thermal sensitive element 17, and forming a valve for controlling the flow of low temperature coolant through the valve 16 and valve housing 11. While the valve surface 41 is herein shown as being formed on the thermal sensitive element, it should be understood that it need not be so formed and that it may be a separate valve mounted on the thermal sensitive element if desired.

The cylindrical wall 39 turns inwardly into a smaller diameter cylindrical wall 43 or guide portion for the valve on the cylinder 33 and loosely extending about said cylinder 33 and accommodating relative movement of said thermal sensitive element with respect to the valve 16.

On the downstream side of the guide portion 43 of the valve 16 is a collar 45, which may be a snap ring snapped on the cylinder 33 in vertically spaced relation with respect to the end of said guide portion 43. The collar 45 engages the end of said guide portion 43 upon increases in temperature of the coolant sufficient to extensibly move the cylinder 33 along the piston 23 to first disengage the valve surface 41 from the seat 40. Further movement of cylinder 33 along the piston 23 will then disengage the valve surface 35 from the shoulder or seat 15.

When the valve is in place in the cooling system of an internal combustion engine, as the temperature of the coolant rises, the cylinder 33 will extensibly move along the piston 23, moving the valve surface of the thermal sensitive element out of engagement with the shoulder 40, it being understood that the pressure of the coolant acting on the valve and the loose fit between the cylindrical guide portion 43 of the valve and the cylinder 33 accommodates movement of the valve surface 41 away from the seat 40 while the valve surface 35 is maintained in engagement with the shoulder 15.

As the valve surface 41 of the thermal sensitive element moves away from the seat 40 coolant will be metered through ports 46 in a shoulder 47 joining the cylindrical wall 39 of the valve 16 to the cylindrical guide portion 43 of said valve. This will relieve pressure from the valve 16 and provide a restricted flow of low temperature coolant, as the cylinder 33 initially moves along the piston 23. During cold weather conditions the valve 41 may be the only valve that will open.

As the temperature of the coolant rises to a degree sufficient to continue operation of the thermal sensitive element 17, the collar 45 will then engage the end of the cylindrical guide portion 43 and move the valve 16 to the open position shown in Figure 3, accommodating the full flow of coolant through the valve.

As the temperature of the coolant is lowered, as when the engine is stopped, the spring 29 will move the cylinder 33 along the piston 23 toward the seat 22 therefor, first moving the valve surface 41 into engagement with the shoulder 40 and then moving the valve surface 35 into engagement with the shoulder or seat 15, to block the passage of fluid through the valve housing 11.

It may be seen from the foregoing that a simplified form of thermostatic coolant control valve has been provided, utilizing an annular valve member floatingly carried on the thermal sensitive element and so arranged that the thermal sensitive element itself forms a low temperature operating valve to accommodate the passage of coolant to the valve member under low temperature operating conditions, and that a single spring serves to retain the thermal sensitive element and valve member in the housing and acts as both a return spring for the valve and thermal sensitive element and an overtravel spring for the thermal sensitive element.

It will be understood that modifications and variations of the present invention may be effected without departing from the spirit and scope of the novel concepts thereof.

I claim as my invention:

1. In a thermostatic valve of the class described, a housing having ports therein for the flow of coolant therethrough, a valve member within said housing controlling the flow of coolant therethrough, a thermal sensitive element for operating said valve member and slidably carried within said housing and having a piston reacting against said housing and also having said valve member floatingly carried thereon for tilting movement with respect thereto and being relatively movable with respect to said housing in an axial direction upon low temperature operating conditions, said valve member having a seat spaced inwardly of the outer periphery thereof, and means biasing said thermal sensitive element toward said seat to meter the flow of low temperature coolant therethrough.

2. In a thermostatically operated valve particularly adapted to control the temperature of the coolant for an internal combustion engine, a housing having an annular shoulder, a valve member within said housing and engageable with said shoulder for blocking the flow of coolant through said housing, a thermal sensitive element carried in said housing for relative movement with respect thereto and with respect to said valve member, said thermal sensitive element comprising a casing slidably carried in said housing, a piston extensible with respect to said casing upon predetermined rises in temperature and reacting against said housing to effect relative movement of said casing wtih respect to said housing upon predetermined temperature rises, a spring biasing said piston into engagement with said housing and forming a return spring for said thermal sensitive element, said valve member being carried on said thermal sensitive element for relative tilting and axial movement with respect thereto and said thermal sensitive element being engageable with said valve member at spaced apart points to effect opening and closing thereof and also controlling the low temperature flow of coolant through said valve member.

3. In a thermostatically operated valve particularly adapted to control the temperature of the coolant of an internal combustion engine, a valve housing having an annular shoulder, a valve member movable along said housing into engagement with said shoulder for blocking the flow of liquid therethrough, a thermal sensitive element within said housing and including a casing containing a fusible thermally expansible material, a cylinder extending from said casing and a piston extensible with respect to said cylinder, a slidable connection between said casing and valve housing, a spring encircling said casing and biasing said piston in abutting engagement with said valve housing and accommodating extensible movement of said cylinder along said piston upon predetermined increases in temperature, said valve member being floatingly carried on said cylinder for tilting and axial movement with respect thereto and having an inwardly spaced annular seat, and said spring biasing said thermal sensitive element into engagement with said seat to block the flow of coolant therethrough and biasing said valve member into engagement with said shoulder to block the passage of coolant through said housing.

4. In a thermostatically operated valve particularly adapted to control the temperature of the coolant of an internal combustion engine, a housing having an annular shoulder, an annular valve member within said housing, a thermal sensitive element carried by said housing for relative movement with respect thereto and comprising a casing slidably guided in said housing, a cylinder extending from said casing and having a piston extensibly carried therein and extending therefrom upon predetermined increases in temperature, said valve member being floatingly mounted on said cylinder for tilting movement with respect thereto and having an annular seat spaced inwardly of the periphery thereof, said thermal sensitive element having a valve surface thereon engageable with said seat to block the passage of fluid through said valve member, a spring encircling said thermal sensitive element and biasing said valve surface into engagement with said seat and said valve into engagement with said shoulder, and abutment means on said cylinder spaced from said valve member and accommodating relative movement of said thermal sensitive element with respect to said valve member in an axial direction and movement of said valve surface of said thermal sensitive element out of engagement with said seat upon predetermined low temperature conditions, said abutment coming into engagement with said valve member upon high temperature conditions and moving said valve member out of engagement with said shoulder, to accommodate the full flow of coolant through said housing.

5. In a thermostatically operated valve particularly adapted to control the temperature of the coolant of an internal combustion engine, a housing for attachment to the cylinder head of an internal combustion engine for communication with the water jacket therein and having an open downstream face having a strap extending thereacross, said housing also having a bridge extending across the upstream face thereof in spaced relation with respect to said strap, a thermal sensitive element having a casing slidably carried in said bridge and having a piston reacting against said strap, a spring maintaining said thermal sensitive element within said housing and said piston in abutting engagement with said strap, and an annular valve floatingly carried on said thermal sensitive element for relative tilting and axial movement with respect thereto and biased by said thermal sensitive element and spring into engagement with said housing to block the flow of coolant therethrough, said thermal sensitive element serving as a valve to control the flow of coolant through said annular valve and first moving out of engagement with said valve to accommodate a flow of low temperature coolant therethrough and then engaging said valve and moving said valve to an open position to accommodate the full flow of coolant through said housing.

6. In a thermostatically operated valve particularly adapted for controlling the temperature of the coolant of an internal combustion engine, a housing for attachment to the cylinder head of an internal combustion engine in communication with a water jacket therein and having an annular shoulder having a strap extending thereacross in a downstream direction and a bridge extending thereacross in an upstream direction in spaced relation with respect to said strap, a thermal sensitive element having a casing containing a thermally expansible fusible material and carried in said bridge for relative movement with respect thereto, said thermal sensitive element having a cylinder extending from said casing and a piston extensible with respect to said cylinder upon fusion of the fusible material contained within said casing upon predetermined increases in temperature, a spring encircling said thermal sensitive element and biasing said piston in engagement with said strap to react thereagainst, a valve floatingly carried on said cylinder for relative tilting and axial movement with respect thereto, said valve having an outer annular valve surface engageable with said shoulder to block the passage of coolant through said housing and also having an inner annular seat, said spring biasing said thermal sensitive element into engagement with said seat to block the passage of coolant therethrough and to bias said valve toward a closed position, and abutment means on said cylinder in spaced relation with respect to said valve when said valve is in its closed position and accommodating said thermal sensitive element to move out of engagement with said valve upon low temperature conditions to accommodate the flow of low temperature coolant therethrough and moving into engagement with said valve upon high temperature conditions, to open said valve for the flow of coolant through said housing.

7. In a thermostatically operated valve particularly adapted to control the temperature of the coolant of an internal combustion engine, a housing for attachment to the cylinder head of an internal combustion engine in communication with the water jacket therein and having an annular shoulder facing in an upstream direction and a strap extending thereacross and outwardly therefrom in a downstream direction, said housing also having a bridge extending thereacross and inwardly with respect thereto in an upstream direction, a thermal sensitive element having a casing containing a fusible thermal expansible material slidably carried in said bridge, said thermal sensitive element also having a cylinder extending from said casing and a piston extensibly carried within said cylinder for extensible movement with respect thereto at the operating range of the thermal sensitive element, a ring extending about said casing, a spring encircling said casing and interposed between said bridge and ring and biasing said piston into engagement with said strap and serving as a return spring for said piston, an annular valve encircling said thermal sensitive element and floatingly carried on said cylinder for relative tilting and axial movement with respect thereto and having an outer annular valve face engageable with said shoulder and an annular seat spaced inwardly therefrom, an abutment member on said cylinder spaced from said valve and engageable therewith upon relative movement of said cylinder with respect to said valve to disengage said annular valve surface from said shoulder, and said ring having a valve surface formed thereon biased into engagement with said seat by said spring and movable out of engagement with said heat to accommodate the flow of low temperature coolant through said valve upon relative movement of said thermal sensitive element with respect to said valve and prior to engagement of said abutment member therewith.

8. A thermostatic valve comprising a valve seat member defining a port therethrough, supporting members extending oppositely from said seat member and having opposed facing portions, an expansible chambered member having rigid side walls with an intermediate radially outwardly extending flange thereon, said chambered member having an expansible end wall acting against one of said portions, said chambered member being disposed within and extending through the port defined by said valve seat, guide means on the other said portions and cooperable with said rigid side walls to guide bodily movement of said chambered member, a valve member slidably mounted on said expansible chambered member between said flange and one of said portions, a compression spring surrounding said chambered member and extending between said flange and the other of said portions, said flange being formed to provide a valve seat cooperable with an intermediate portion of said valve member, the inner portion of said valve member being spaced from said chambered member between said intermediate portion of said valve member and said rigid walls of said chambered member, said inner portion having at least one fluid opening therethrough, an expansible temperature responsive medium in said chambered member, and means on said chambered member for engaging and moving said valve member after said flange portion has been moved a predetermined distance away from said intermediate valve portion upon expansion of said medium.

References Cited in the file of this patent

UNITED STATES PATENTS

| | | |
|---|---|---|
| 2,174,042 | Rose | Sept. 26, 1939 |
| 2,356,958 | Waggenheim | Aug. 29, 1944 |

FOREIGN PATENTS

| | | |
|---|---|---|
| 24,449 | Sweden | May 16, 1905 |